July 15, 1952 L. D. HERSHEY 2,603,371
APPARATUS FOR COLLECTING AND LOADING MATERIALS
Filed April 18, 1950 12 Sheets-Sheet 1
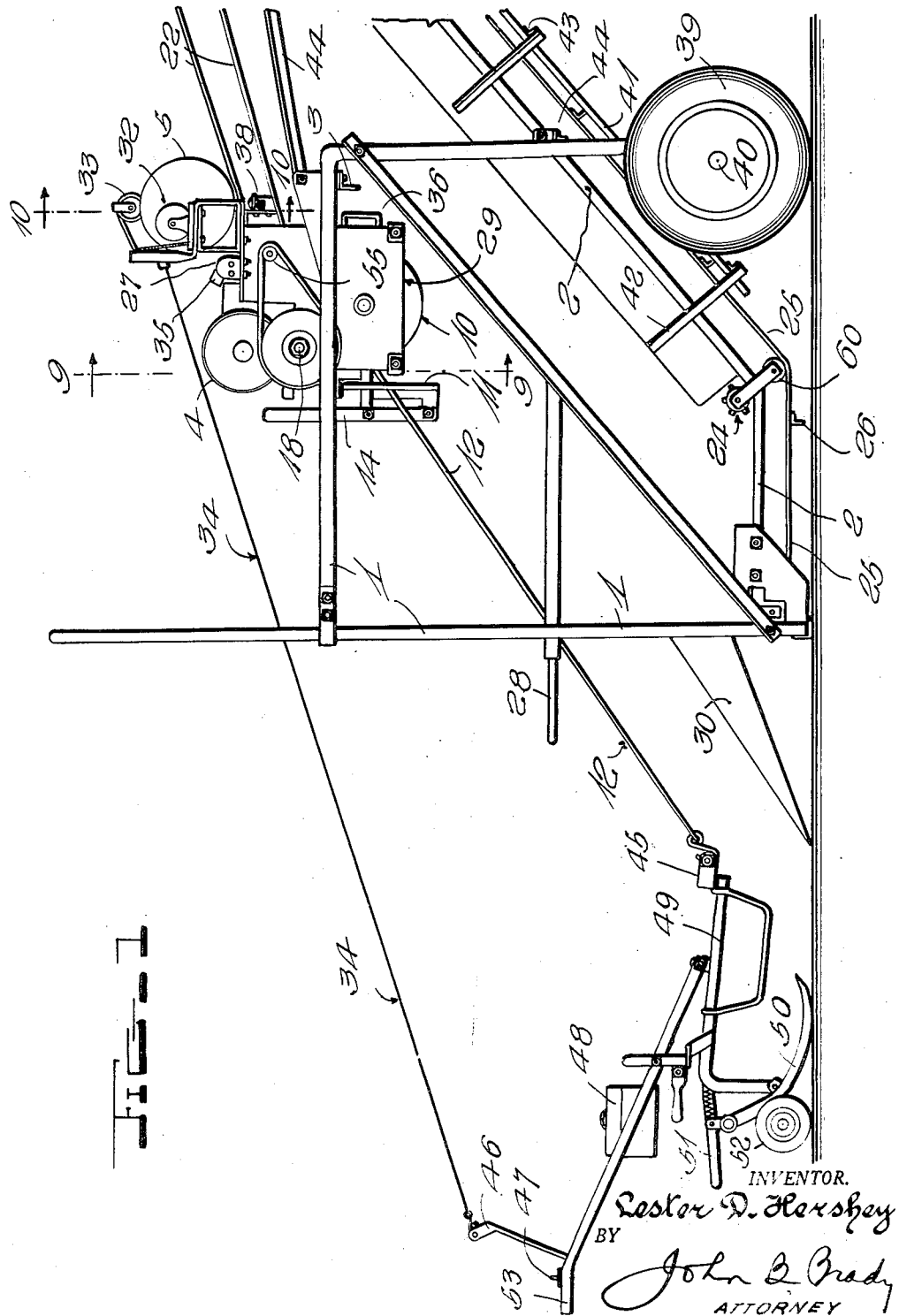
INVENTOR.
Lester D. Hershey
BY
John B. Brady
ATTORNEY July 15, 1952  L. D. HERSHEY  2,603,371
APPARATUS FOR COLLECTING AND LOADING MATERIALS
Filed April 18, 1950  12 Sheets-Sheet 2
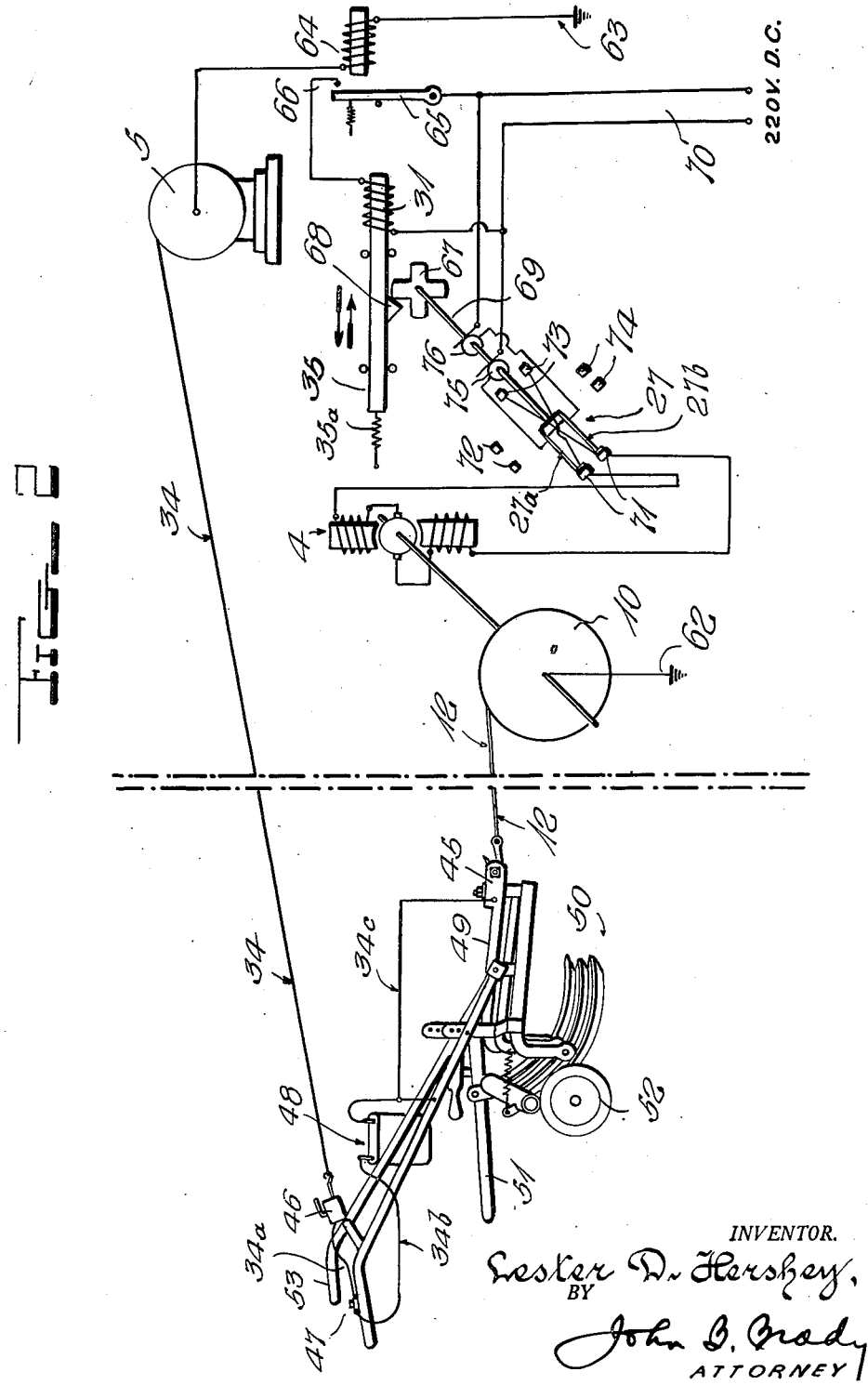
INVENTOR.
Lester D. Hershey,
BY
John B. Brady
ATTORNEY

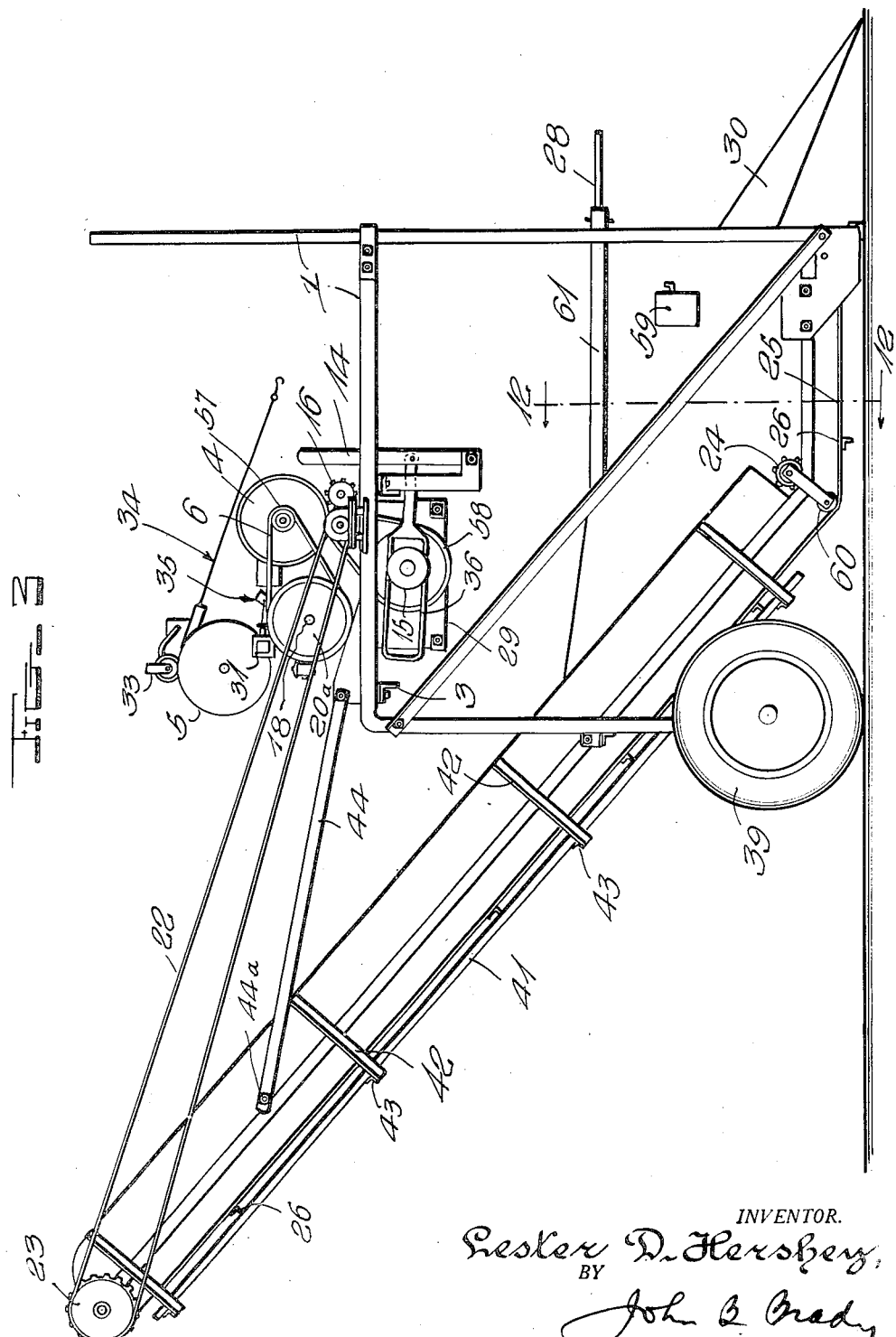

July 15, 1952 L. D. HERSHEY 2,603,371
APPARATUS FOR COLLECTING AND LOADING MATERIALS
Filed April 18, 1950 12 Sheets-Sheet 4
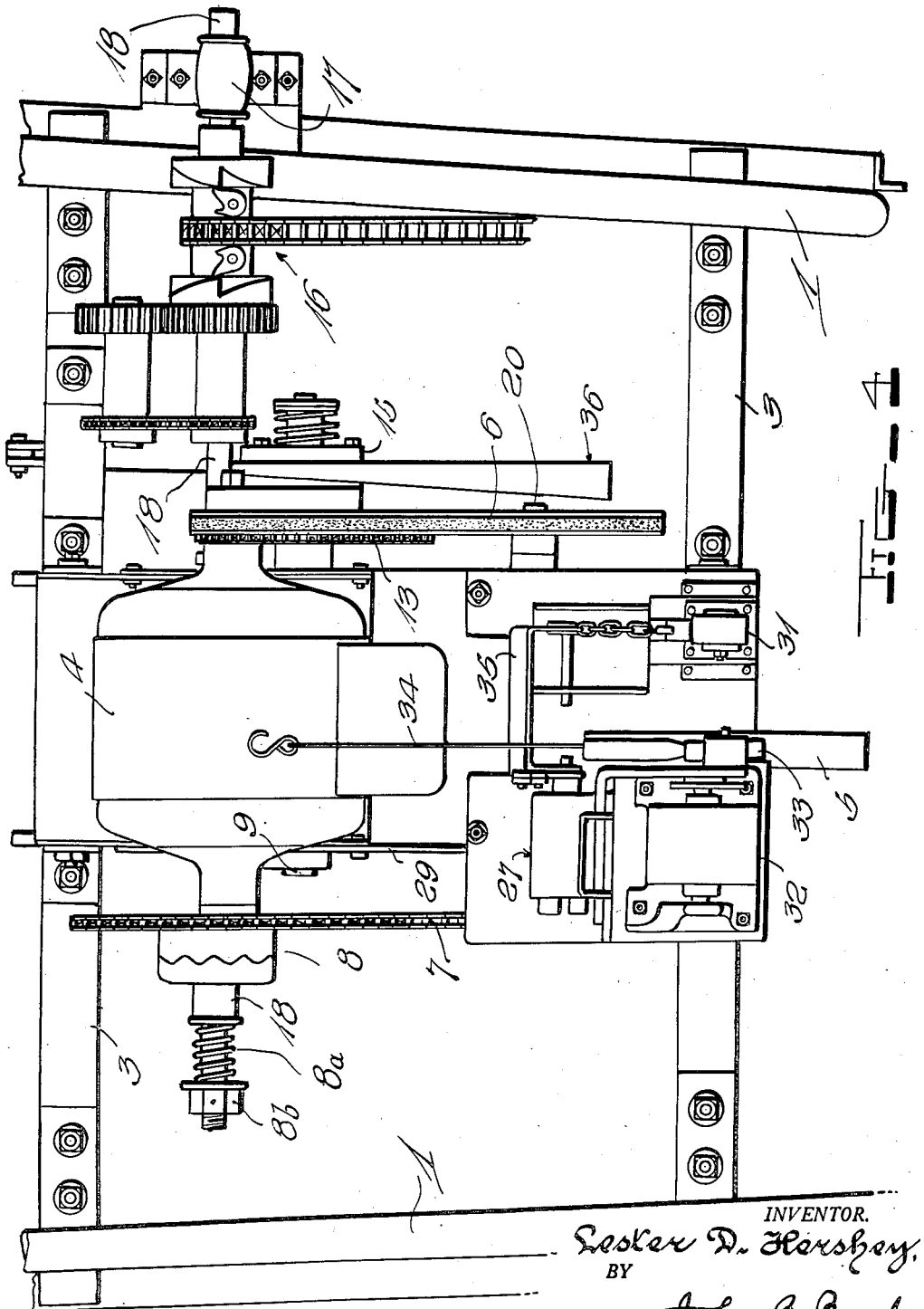

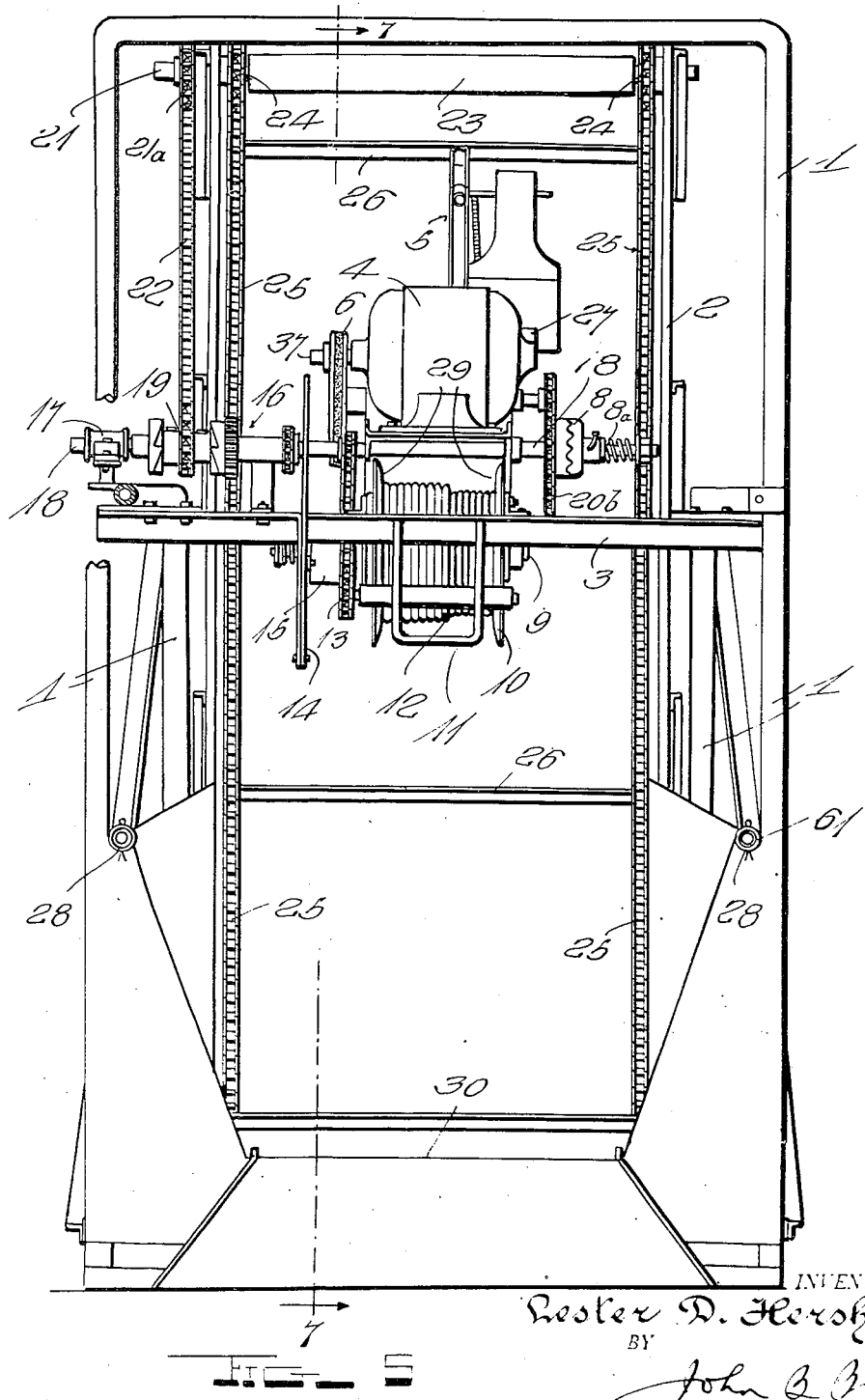

July 15, 1952        L. D. HERSHEY        2,603,371
APPARATUS FOR COLLECTING AND LOADING MATERIALS
Filed April 18, 1950        12 Sheets-Sheet 6
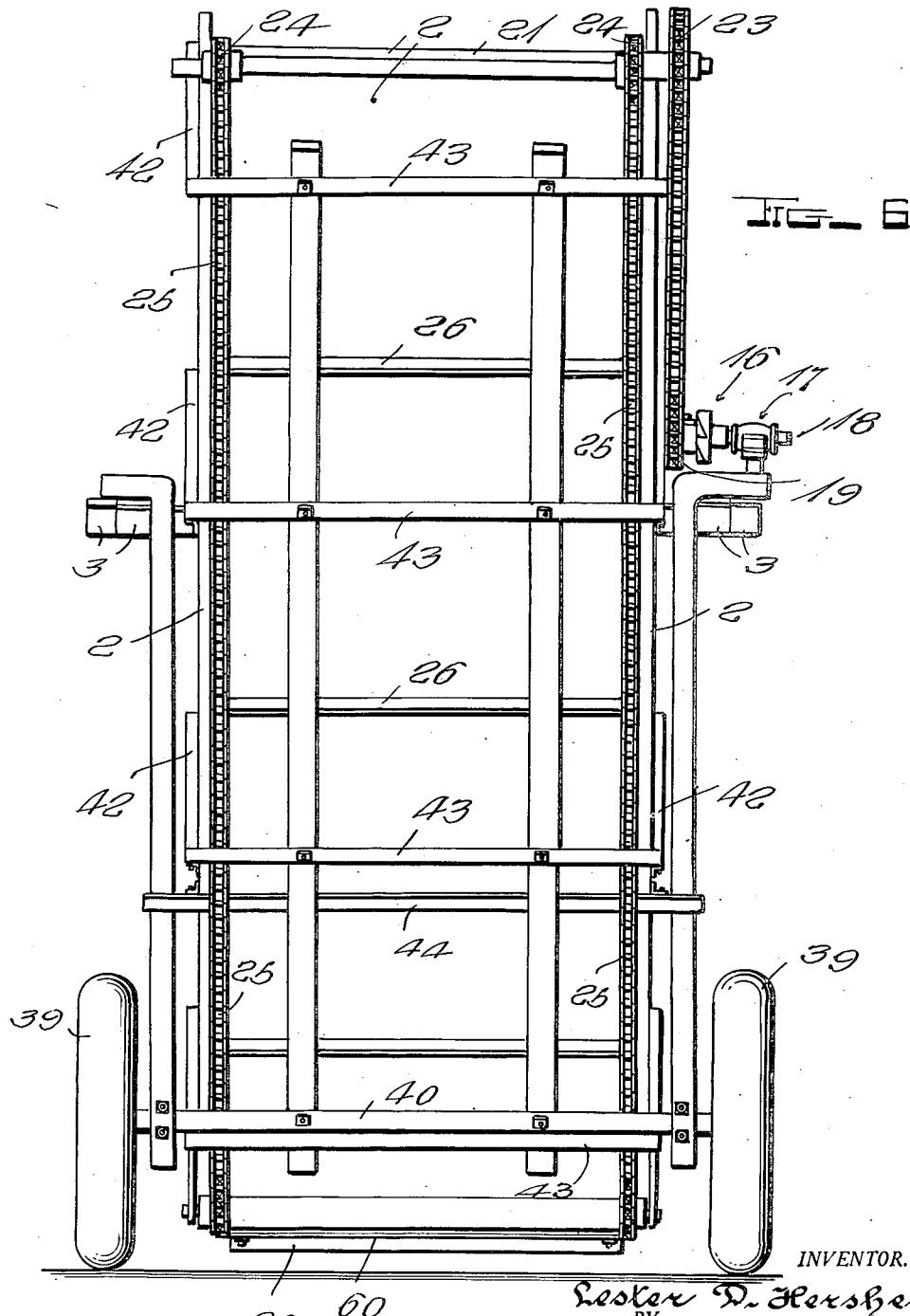

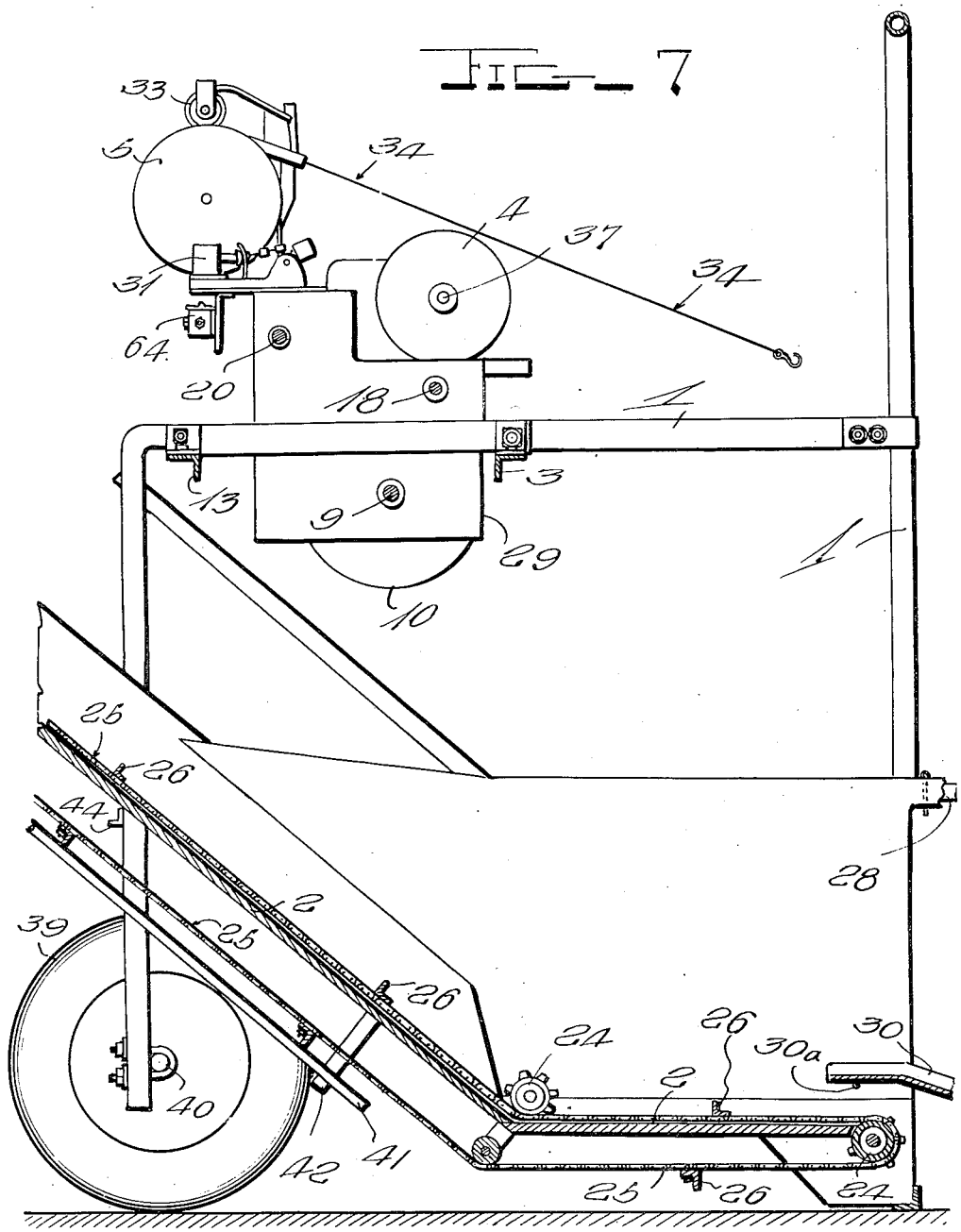

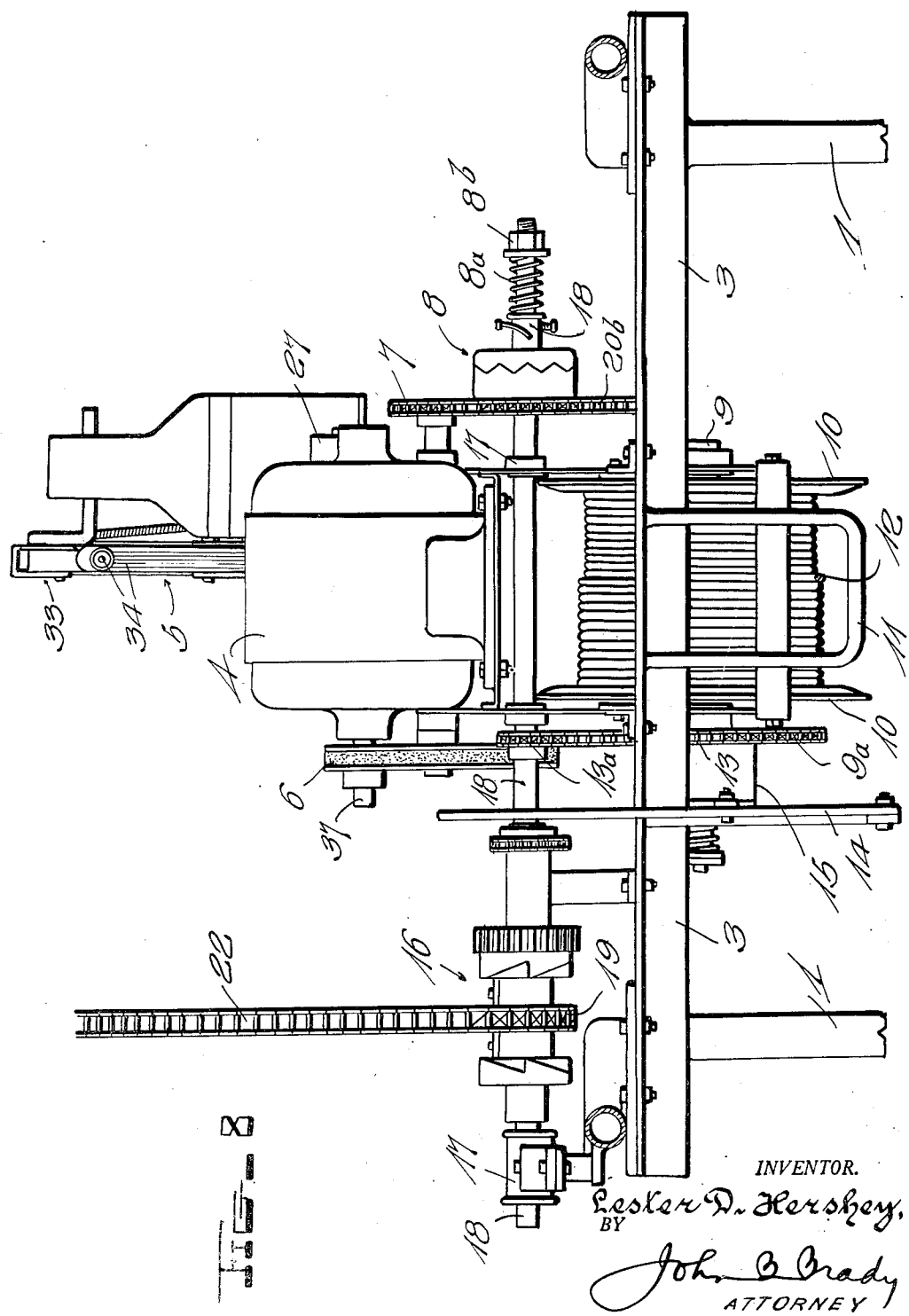

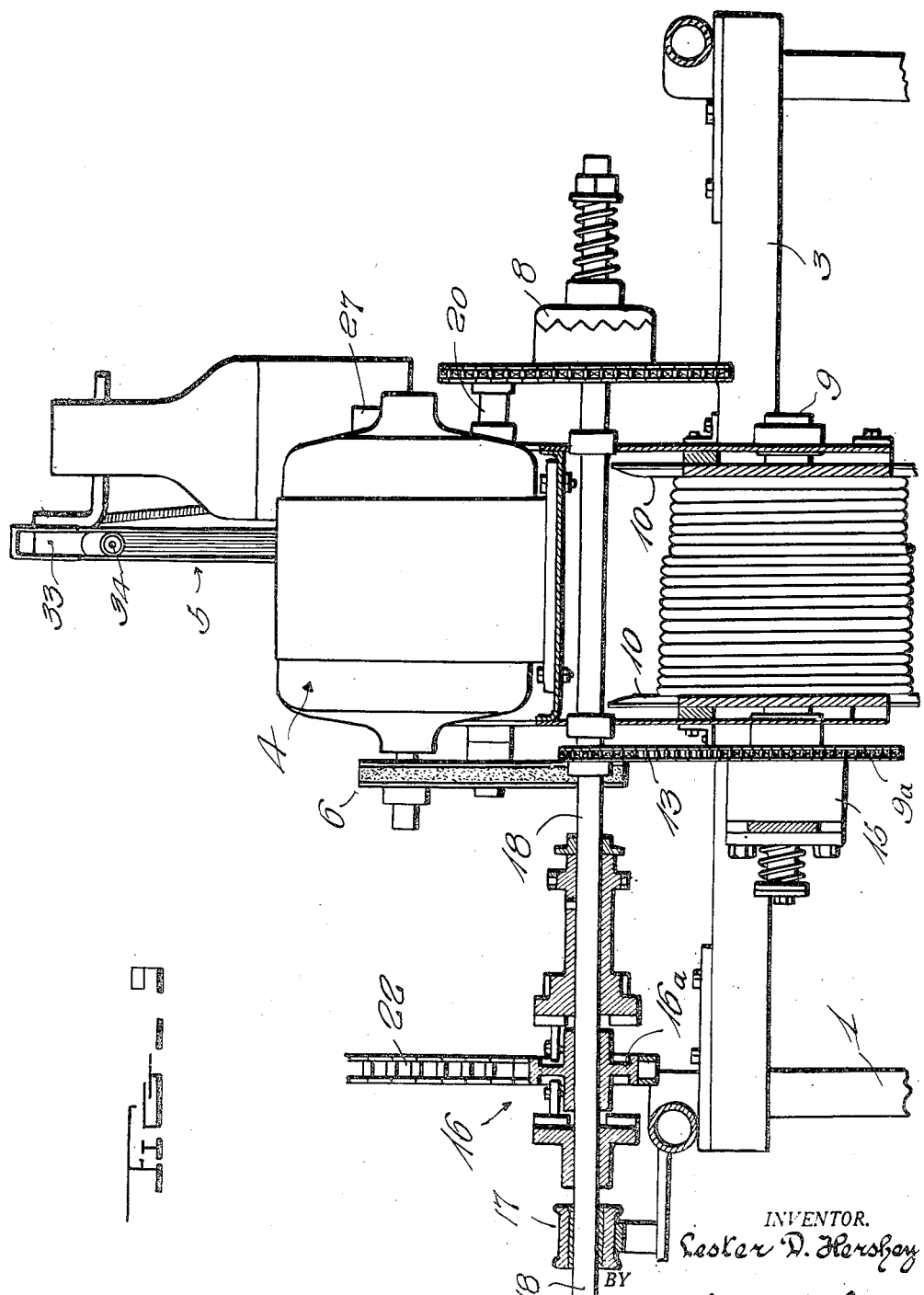

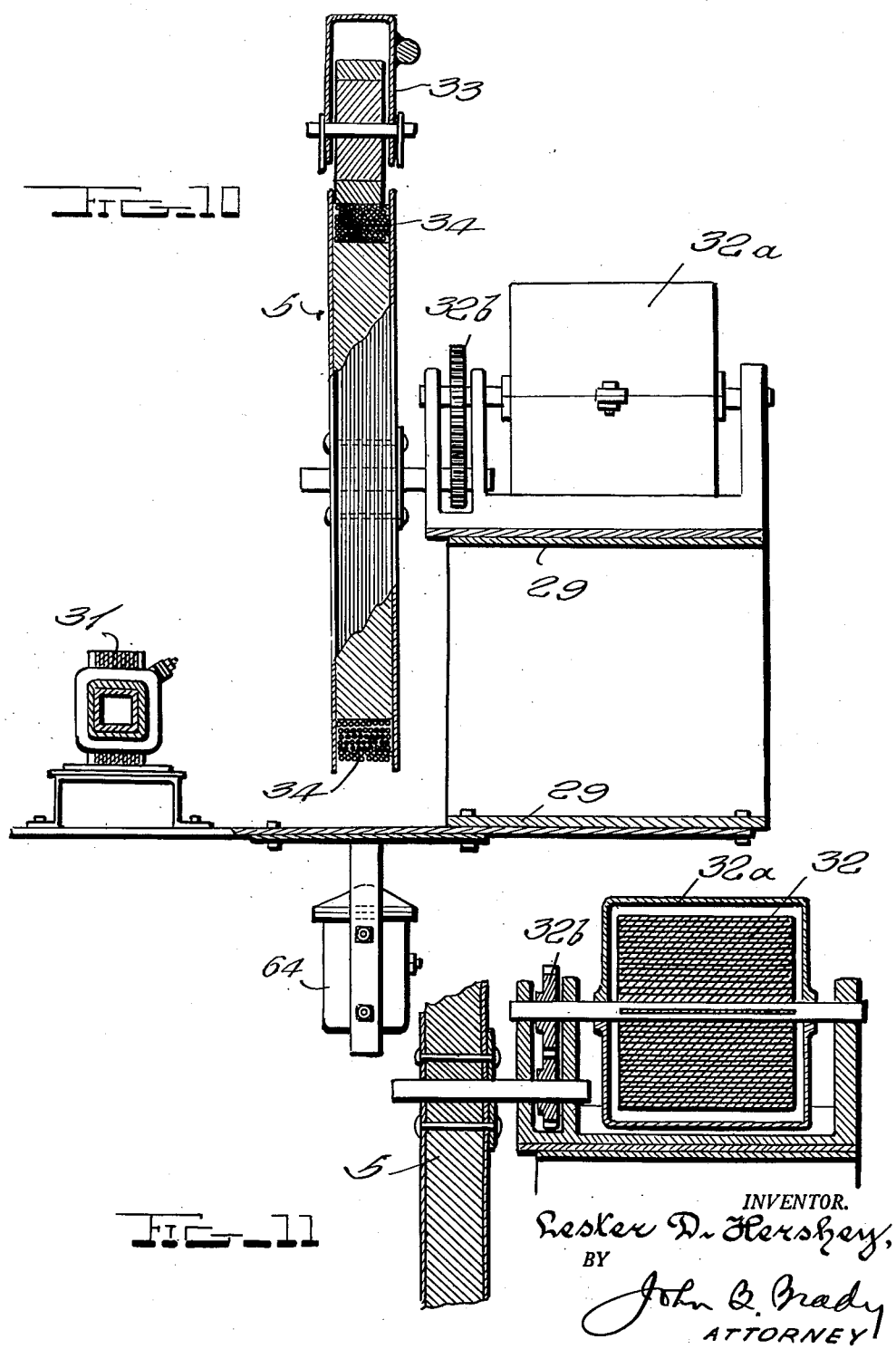

July 15, 1952     L. D. HERSHEY     2,603,371
APPARATUS FOR COLLECTING AND LOADING MATERIALS
Filed April 18, 1950     12 Sheets-Sheet 11
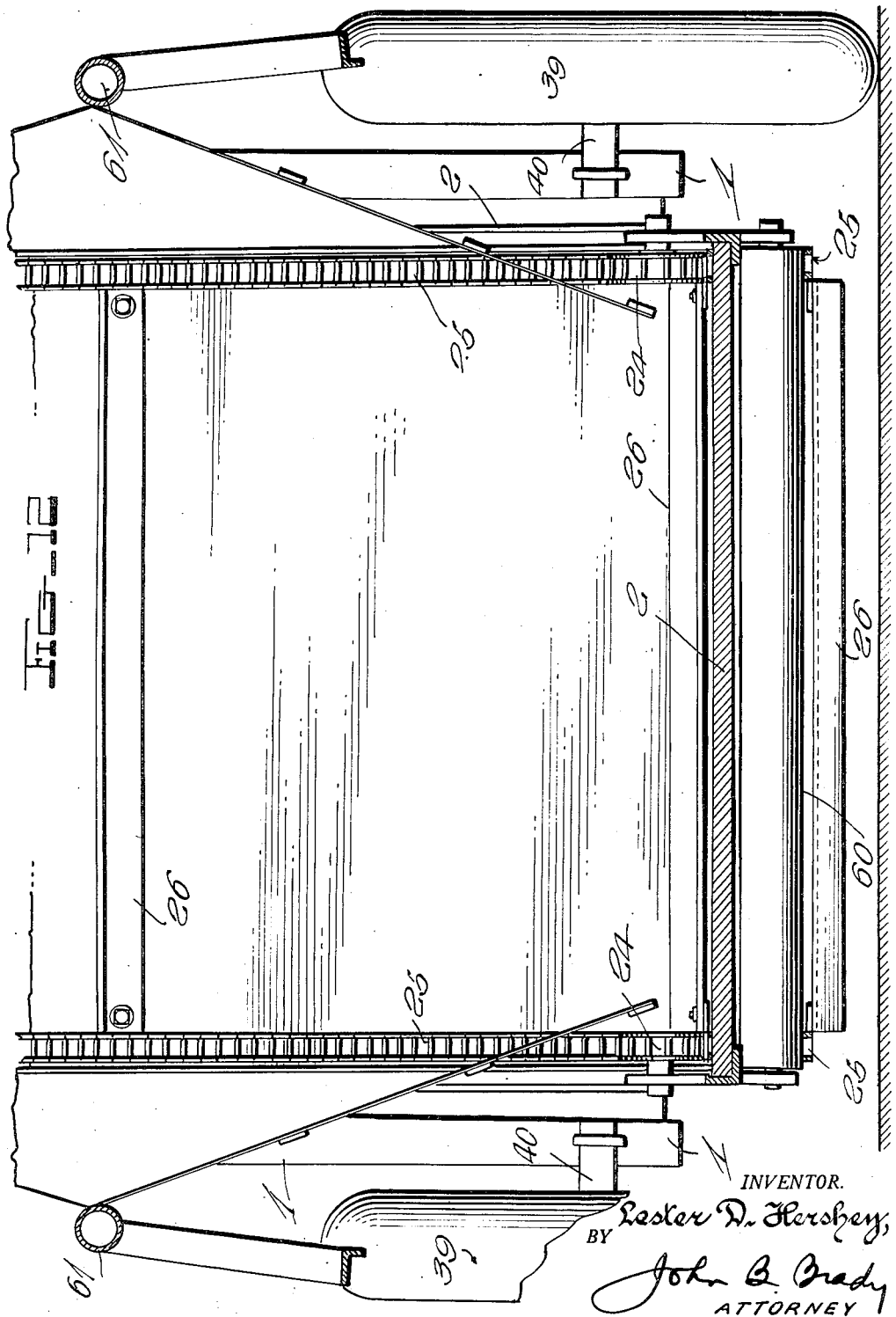
INVENTOR.
Lester D. Hershey,
BY John B. Brady
ATTORNEY

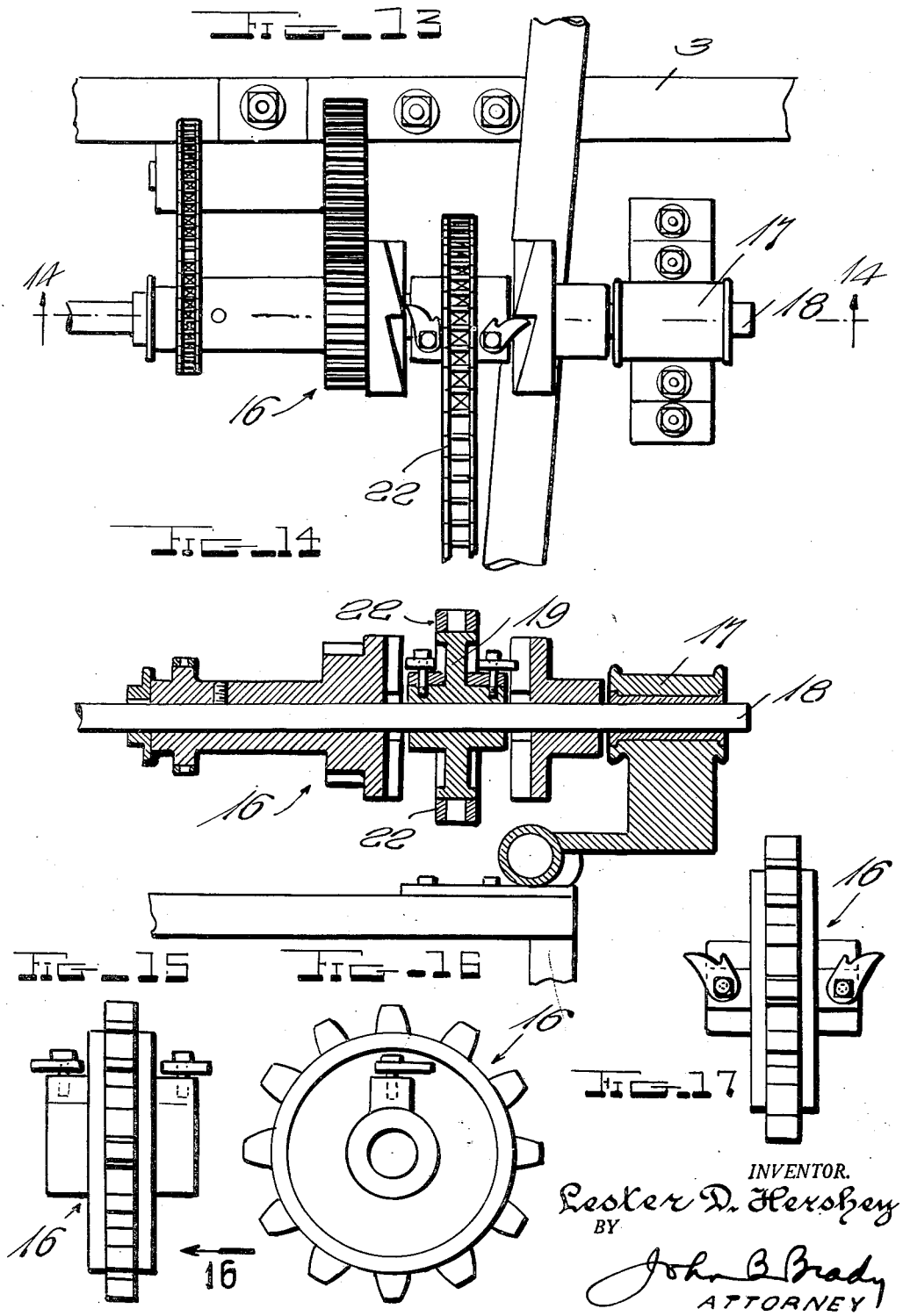

Patented July 15, 1952

2,603,371

UNITED STATES PATENT OFFICE 2,603,371

APPARATUS FOR COLLECTING AND LOADING MATERIALS

Lester D. Hershey, Gap, Pa.

Application April 18, 1950, Serial No. 156,689

5 Claims. (Cl. 214—93)

My invention relates broadly to a conveying method and conveying apparatus, and more particularly to a composite endless conveyer and traveling conveyer for loading the endless conveyer.

One of the objects of my invention is to provide a system and apparatus for conveying materials, and more particularly to control means for manipulating such apparatus.

Another object of my invention is to provide a method of operation of conveying apparatus whereby motor operating mechanism is associated with clutch mechanism which may be manipulated to selectively or simultaneously control an endless conveyer and a traveling conveyer for loading the endless conveyer.

Still another object of my invention is to provide a coacting arrangement of portable endless conveyer and traveling conveyer for loading the endless conveyer wherein the same driving motor is arranged to operate both conveyers through controllable clutch mechanism for selectively actuating one or the other of the conveyers where the traveling conveyer may be operated in either direction while the endless conveyer operates unidirectionally through readily controllable clutch mechanism.

Still another object of my invention is to provide a portable endless conveyer readily movable to a loading position for coaction with a traveling conveyer operative in a linear direction with respect to the endless conveyer for loading the endless conveyer in combination with control means on the traveling conveyer for controlling the movement of the traveling conveyer with respect to the endless conveyer in loading the endless conveyer.

Still another object of my invention is to provide an arrangement of portable frame support for an endless conveyer and electrically operated drive means therefor, with means for utilizing the drive means for operating a traveling conveyer arranged to load the endless conveyer, with means on the traveling conveyer for electrically controlling the drive means on the portable frame support.

Still another object of my invention is to provide a construction of constant direction conveyer drive means for a composite endless conveyer and coacting traveling feed conveyer for the endless conveyer, by which said drive means may apply a driving force unilaterally to the endless conveyer while the coacting traveling conveyer may operate bilaterally with respect to the endless conveyer.

Still another object of my invention is to provide a readily portable frame structure movable to any desired loading position and serving as a support for an endless conveyer and a motor operated reduction gear drive means associated therewith, and including a reel operated carrier for an electric conductor which may be extended or retracted with respect thereto for maintaining an electrical control circuit to a traveling conveyer coacting with the said endless conveyer for controlling on the readily portable frame structure a cable drum mechanism for exerting a pulling force on the traveling conveyer for linearly drawing the traveling conveyer in the direction of the endless conveyer for loading the endless conveyer.

A still further object of my invention is to provide an electrical circuit control means for a traveling conveyer coacting with an endless conveyer where the traveling conveyer is linearly pulled through a cable toward the endless conveyer in effecting a gathering operation for loading the endless conveyer, and wherein motor operated mechanism mounted adjacent the endless conveyer for controllably operating both the endless conveyer and the traveling conveyer has the electric control circuit completed through the pulling cable and a single electrical conductor variably extensible from the endless conveyer position.

Still another object of my invention is to provide an arrangement of electrical control circuit for a composite endless conveyer and linearly moving traveling conveyer in which driving apparatus at the endless conveyer position is controlled through the pull cable extending between the endless conveyer position and the traveling conveyer supplemented by a circuit through an electrical conductor retrievably mounted adjacent the endless conveyer position and extending to the traveling conveyer.

Other and further objects of my invention reside in the construction and arrangement of component parts of the coacting endless conveyer and traveling conveyer of my invention, and the selective electrical and mechanical control means therefor, as set forth more fully in the specification hereinafter following by reference to the accompanying drawings, in which:

Figure 1 is a schematic side elevational view of the motor operating mechanism mounted on the portable frame structure which carries the endless conveyer and operates both the endless conveyer and the coacting traveling conveyer for loading the endless conveyer, the electrical circuit control means being illustrated in relation to the traveling conveyer; Fig. 2 schematically shows the electrical circuit control system used in the loading method and apparatus of my invention, particularly illustrating the retrievable electrical conductor carried by the portable frame structure and connected with the traveling conveyer and forming one side of the electrical control circuit while the other side of the electrical control circuit is completed through the pull cable which is operated by the cable pulling mechanism carried by the portable frame structure; Fig. 3 is an enlarged side elevational view of the left side of the portable frame structure and endless conveyer carried thereby, and showing more clearly the manner of mounting the retriever for the electrical conductor extending to the traveling conveyer and the mounting for the motor and gear mechanism which drives the endless conveyer and furnishes the pulling force for operating the coacting traveling conveyer; Fig. 4 is an enlarged top plan view of the driving motor mounted on the portable frame structure and showing the associated gear and clutch mechanism and particularly illustrating the constant direction conveyer drive employed in the system of my invention; Fig. 5 is a front view of the portable frame structure and carrier for the endless conveyer and the motor mechanism for operating both the endless conveyer and the coacting traveling conveyer; Fig. 6 is a rear view of the portable frame structure and endless conveyer mounted thereon, the view being taken in a direction opposite to the view illustrated in Fig. 5; Fig. 7 is a fragmentary longitudinal sectional view taken substantially on line 7—7 of Fig. 5 and showing the relative arrangement of the endless conveyer with respect to the motor operated drive mechanism and the retrieving reel for the electrical conductor which extends to the traveling conveyer in the system of my invention; Fig. 8 is an elevational view on an enlarged scale showing the relative arrangement of the driving motor mounted on the portable frame structure, the associated drive mechanism for the cable drum, the constant direction conveyer drive for the endless conveyer, and the retrieving reel for the electrical conductor leading to the traveling conveyer; Fig. 9 is a fragmentary vertical sectional view on an enlarged scale taken substantially on line 9—9 of Fig. 1; Fig. 10 is a fragmentary vertical sectional view on an enlarged scale taken substantially on line 10—10 of Fig. 1; Fig. 11 is a fragmentary vertical sectional view taken through the tensioning means for the retrieving reel for the electrical conductor extending from the frame structure of the endless conveyer to the traveling conveyer; Fig. 12 is a vertical sectional view on an enlarged scale taken substantially on line 12—12 of Fig. 3; Fig. 13 is a top plan view of the constant direction conveyer drive whereby the endless conveyer may be maintained in operation unilaterally while the cable drum may be operated bilaterally; Fig. 14 is a vertical sectional view taken substantially on line 14—14 of Fig. 13; Fig. 15 is a fragmentary end elevational view of the double ratchet means carried by the endless conveyer sprocket drive in the constant direction conveyer drive mechanism of Figs. 13 and 14; Fig. 16 is an elevational view of the drive shown in Fig. 15, looking in the direction of arrow 16; and Fig. 17 is a top plan view of the assembly illustrated in Figs. 15 and 16 and showing the manner in which the dogs carried by the central sprocket of the constant direction conveyer drive effect controlled engagement with the double clutch faces of the constant direction conveyer drive illustrated in Figs. 13 and 14.

Referring to the drawings in more detail, reference character 1 designates the frame of the portable frame structure, which may be made from 1¼" pipe, that carries the endless conveyer, the drive means therefor, the clutch mechanism, and the electrical conductor supply and retrieving reel for completing the electrical conductor circuit system from the portable frame structure to the traveling conveyer. The frame 1 provides mounting means for the endless conveyer frame 2 which is formed from angle iron such as 1" x 1" x ¼", serving as supporting means for bottom and side boards made from material capable of resisting acids or moisture encountered in the handling of various materials. Adjacent the top of the frame 1, I provide the operating mechanism support 3, formed from somewhat heavier angle iron such as 2" x 2".

A reversible electric motor 4 is mounted on the operating mechanism support 3, which is controllable by electrical circuits manipulated from the traveling conveyer position, as will be more fully explained hereinafter. For certain of the applications of my invention, I have found a 1½ H. P. motor adequate for handling of normal loads, but it will be understood that wherever I have mentioned sizes throughout this specification, that these sizes are intended to illustrate parameters suitable for certain applications of my invention and which may be increased or decreased to meet conditions of each specific problem.

Operating mechanism support 3 also provides a support for wire supply and retrieving reel 5, which supplies the electrical conductor 34 leading to the control circuit on the traveling conveyer. The supply and retrieving reel 5 is maintained under slight tension by means of tension spring 32 housed within casing 32a and operating through gears 32b, as illustrated more particularly in Figs. 10 and 11. The reference character 6 indicates the main drive V-belt driven by motor 4 for driving pulley member 20a on main shaft 18. Main shaft 18 carries sprocket wheel 20b on the end thereof engaging sprocket chain 7. Sprocket chain 7 operates with respect to sprocket wheel 20b in reducing speed and obtaining a positive drive without slippage. In order to protect the parts of the mechanism against breakage under conditions of undue strain, I provide a slip clutch 8 on the shaft 18 that drives both the endless conveyer and the cable drum, so that if either the endless conveyer or the cable drum encounters an obstruction and becomes overloaded, the clutch 8 will slip against the tension of coil spring 8a. The clatter or noise resulting from this continuous slippage serves to warn the operator so that correction may be made. An adjustable nut 8b is provided on shaft 18 for adjusting the tension of coil spring 8a.

Reference character 9 designates the cable drum shaft. This cable drum shaft must withstand considerable strain and I have accordingly made this shaft in many applications of the structure 1½" in diameter. The cable drum is indicated at 10 having side flanges in certain applications of approximately 12" in diameter, with an inside spacing of 5" and an outside dimension of 7". The cable drum journalled on shaft 9 is mounted for rotation with respect to the operating mechanism support 3, and is protected by means of a guard 11 which may be formed from 5/8" round iron. The cable carried by the cable drum 10 is represented at 12. The shaft 9 carrying the cable drum 10 is driven by sprocket wheel 9a, over which sprocket chain 13 operates. Sprocket chain 13 extends over sprocket wheel 13a carried by shaft 18, whereby cable drum 10 may be driven from shaft 18. Shaft 18 is journalled with respect to the operating mechanism support 3, and is associated with clutch 14—15—36 to disengage the drum 10, so that the endless conveyer may be operated independently should the operator wish to use the conveyer for other loading purposes or cleaning up around the conveyer. In order to operate the clutch mechanism the operator pulls the lever 14 toward himself, disengaging the drum 10, so that the endless conveyer runs alone. Under these conditions the endless conveyer can be stopped and started from the control circuit on the traveling conveyer, as will be hereinafter described. The shaft 18 has associated therewith the constant direction conveyer drive which I have designated at 16. The constant direction conveyer drive and the components thereof are shown more particularly in Figs. 13-17, and include a central sprocket wheel 19 which engages the chain 22 for driving the endless conveyer. Shaft 18 is illustrated as journalled in the bearings 17 supported from the operating mechanism support 3. Shaft 21 is journalled adjacent the top of the frame structure 1 in suitable bearings, and is provided with a sprocket wheel 21a thereon, over which sprocket chain 22 extending from sprocket wheel 19 operates to drive the endless conveyer 23. In certain of the applications of my invention this sprocket 21a has had a diameter of 8" and drives through shaft 21 the sprockets 24 of 4" diameter. Sprockets 24 engage sprocket chains 25, which carry the transversely extending angle bars 26 which form part of the endless conveyer. A suitable flexible wire mesh or flexible fabric may be stretched over the transvesrely extending bars to provide a solid but flexible endless conveyer. These bars may be formed of angle iron 1" x 1" x 3/16", and are supported by sliding along frame strips 41. The endless conveyer is provided with a frame enclosing the conveyer and constituted by angle irons 42 which support the side boards and tranversely extending angle irons 43. Reference character 44 designates brace means for mounting the conveyer frame in the portable frame support, one of such brace means extending from the side of the portable frame support 1, and the other of the brace means extending from a position adjacent the top of the portable frame support 1 to a position at 44a adjacent the top of the endless conveyer frame.

A revolving switch 27 may be provided for controlling the operation of the motor under conditions of forward, stop, or reverse. Switch 27 may be controlled by solenoid 31, which pulls operating bar 35 to move the reversing switch 27 a quarter turn. By impulsing the solenoid four times the switch 27 may be selectively moved to forward, stop, reverse and stop positions. These control impulses are transmitted from the traveling conveyer position, as will be more fully explained hereinafter.

The handle bars for the portable frame 1 are represented at 28, the handle bars being retractable into the frame structure or extendible therefrom when the portable unit is to be rolled on the wheels 39 mounted on axle 40 from one location to another. The handle bars 28, when retracted into frame structure 1, are substantially flush with one side of the frame structure and are out of the way.

The motor control mechanism is supported in case 29 which encloses the bearings for the three shafts which provide the required speed reductions. Case 29 may be formed from 3/16" sheet metal.

The portable frame structure 1 carries a ramp 30 which is hinged at 30a, and may be let down on the ground or floor while loading, and is readily folded up into the frame structure while moving the unit to another location.

The system may be operated from the standard source of farm lighting current, such as 220 volts, supplied to the motor 4 under control of relay solenoid 64. The motor is controlled as to direction by switch 27, as hereinbefore described. Electrical conductor 34, which is carried by the supply and retrieving reel 5, is controlled as it is reeled on and off reel 5 by means of the follower roll shown at 33, which is covered with sponge rubber or the like, and held down against the conductor 34 as it is reeled on and off the reel 5 by means of spring 33a. The conductor 34, as it reels on and off reel 5, passes through a small pipe 33b, which confines the conductor to such a position that the conductor will not slip off the reel 5. The conductor 34 extends to the traveling conveyer which has been shown more particularly in Figs. 1 and 2 comprising hitch member 46, fastened adjacent the handle bars 53 of the traveling conveyer, and forming an electrical connection through conductor 34a leading to the push switch 47 mounted adjacent the handle bars 53. The push switch 47 connects through conductor 34b to the dry cell battery 48 carried by the traveling conveyer. The opposite terminal of the dry cell battery 48 connects through lead 34c grounded to the frame of the traveling conveyer and leading to the hitch 45 at the front of the traveling conveyer. The hitch 45 is larger than hitch 46, as hitch 45 must withstand the load of the entire traveling conveyer in its operation through pull cable 12 operating over cable drum 10. The traveling conveyer is formed by a multiplicity of spaced flat iron strips 49, formed into the frame of the conveyer and connected with the tines 50 formed by T-irons tapered to a point. The T-irons 50 are associated with the flat iron strips 49 of the frame structure of the traveling conveyer, and the relative position thereof controlled by means of lever 51 which may lower the tines 50 in position as shown, or which may raise the tines 50 by moving the frame structure of the traveling conveyer around the axle of the wheel structure 52, so that the traveling conveyer may be rolled on wheel structure 52 when a gathering operation by use of tines 50 is not desired.

The manner of imparting pulling forces from the motive power on the frame structure which carries the endless conveyer is believed to be clear from the foregoing description, so that I summarize the pulling arrangement by pointing out that sprocket 54, driven from motor 4, drives sprocket 55 through the V-belt which connects V-belt 56 and V-belt 57. The sprocket 58 drives the endless conveyer through shaft 18. The master control switch 59 is mounted in a convenient position on the frame support for the endless conveyer, where it can be easily reached by the operator to shut down the complete system, or to turn on the power circuits to the complete system for operation of the conveyer system.

The endless conveyer is maintained taut for operation under the loads encountered, by suitable spring tensioned rollers represented, for example, by roller 60.

The frame which supports the endless conveyer may be moved from one location to another by the bars 28, which are retractable and extendible, as heretofore explained, within the confines of the frame member 61 associated with the frame structure 1.

The frame structure 1 is suitably counterweighted to overcome all reasonable conditions which may be encountered in the pulling of heavy loads through cable 12 operating over cable drum 10, due regard being had for the fact that considerable mass must be located adjacent the top of the frame structure 1 in order to obtain proper clearance for the electrical conductor 34 and the pulling cable 12.

The traveling conveyer has the electrical control circuit from conductor 34 completed through conductors 34a, 34b and 34c, leading to hitch 45 and thence through cable 12 around cable drum 10 to the ground connection indicated at 62. The circuit through ground 62, which may be the metallic frame of frame structure 1, is completed through ground connection 63 and relay winding 64, returning to the retrieving reel 5. Thus, it will be clear that when switch 47 on the traveling conveyer is pushed momentarily, an impulse is sent over the wire circuit 34, 34a, 34b, 34c and pull cable 12, serving to activate relay 64 and move armature 65, closing contact 66. The solenoid 31 heretofore referred to, is thus given a momentary impulse which pulls operating bar 35, schematically shown in Fig. 2, to the left against the operation of spring 35a. This has the effect of revolving the quadrantal cam member 67 through approximately 90° by the contacting relation of detent 68 therewith. The quadrantal cam member 67 is mounted on shaft 69, and moves control switch 27 through suitable gearing. Control switch 27 has four positions corresponding to forward, start, reverse and stop. These positions control the delivery of power from 220 D. C. volt source 70 to the contacts controlled by switch 27. The 220 D. C. volt power is employed for operating the solenoid 31 through contact 66 and relay armature 65, and is also used to supply operating power to motor 4. The rotary switch 27 comprises two arms 27a and 27b which are electrically insulated from each other and mechanically mounted to wipe the sets of contacts represented at 71, 72, 73 and 74 arranged in the sweep path of the arms as the shaft 69 is revolved step by step under control of quadrantal cam member 67. Sets of contacts 71 are connected in reverse to the diametrically opposite sets of contacts 73, so that as the switch shifts angularly from the sets of contacts 71 to the sets of contacts 73, the motor 4 is subjected to current reversal, thereby controlling the direction of operation of motor 4 and correspondingly the direction of operation of cable drum 10. Circuit connections to the supply source 70, to the sets of reversibly wired contacts 71 and 73, are completed through slip ring and brush connections shown at 75 and 76. In effecting this reverse and forward movement, switch 27 passes through two "stop" positions, that is, at sets of contact 72 and sets of contact 74. Thus, it will be clear that the operator at the traveling conveyer, by pushing the spring restored momentary contact switch 47, may effect step by step control of rotary switch 27 for operating motor 4 in successive order of forward, stop, reverse, stop, and repeat operations. This is accomplished by the reciprocatory plunger 35 which is restored after each impulse operation under control of spring 35a.

The combination endless conveyer and traveling conveyer, with the flexibility of control explained herein, has been found to be very practical and successful in operation in many applications. A variety of loading operations may be carried out for gathering loads which are deposited at the endless conveyer position and the loads elevated into trucks or cars for transportation from the loading location.

One of the applications of my invention, which has proven particularly useful, is in connection with dairy farming, in which stables must be cleaned from time to time. The traveling conveyer, including tines 50, has been found particularly effective in excavating the manure from the trough or gutter extending the length of the dairy stables, and delivering the loads to the endless conveyer and so continuously delivered to a truck for loading and disposal. The application of my invention to this use has solved a problem which saves considerable time and labor, and has been one of the problems of dairy farming.

While I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. In an apparatus of the class described comprising a portable frame structure, an inclined endless conveyer mounted in said portable frame structure in an inclined position for receiving material adjacent the bottom of said frame structure and elevating material to a position substantially above said portable frame structure, a prime mover mounted on said portable frame structure, cable winding and unwinding mechanism supported by said portable frame structure, a reel for receiving and storing an electrical conductor mounted on said portable frame structure, a traveling conveyer operative in a linear direction for gathering material and loading said inclined endless conveyer, electrical control means on said traveling conveyer, an electrical conductor extendible from and retractable with respect to said reel and connectable with the electrical control means on said traveling conveyer to establish one side of an electrical control circuit, a pulling cable for connecting said traveling conveyer with said cable winding and unwinding mechanism on said portable frame structure and forming the other side of the electrical control circuit, and means controlled over the electrical circuit established on the one side through said electrical conductor extending to said reel and through said pulling cable on the other side for starting, stopping and reversing said cable winding and unwinding mechanism for controlling the movement of said traveling conveyer with respect to said inclined endless conveyer for selectively effecting loading operations of said inclined endless conveyer.

2. In an apparatus of the class described as set forth in claim 1 clutch mechanism located adjacent said prime mover and coacting therewith, and means for continuously driving said inclined endless conveyer through said clutch mechanism while selectively operating said cable winding and unwinding mechanism responsive to the electrical control means on said traveling conveyer.

3. An apparatus of the class described as set forth in claim 1 including means for continuously subjecting said reel to a turning torque for retrieving said electrical conductor as said cable winding and unwinding mechanism operates to draw said traveling conveyer linearly toward said inclined endless conveyer.

4. An apparatus of the class described as set forth in claim 1 in which a spring operated motor is connected with said reel for operating said reel for retrieving said electrical conductor and storing said electrical conductor upon said reel as said pulling cable operates to draw said traveling conveyer toward said inclined endless conveyer, a power source carried by said traveling conveyer and electrically connectable through the electrical control means thereon in the circuit through said electrical conductor and through said pulling cable for effecting the operation of said cable winding and unwinding mechanism in starting, stopping and reversing said traveling conveyer with respect to said inclined endless conveyer during the gathering and loading operations.

5. An apparatus of the class described comprising in combination a frame structure, an endless conveyer mounted in an inclined plane in said frame structure for performing a loading operation, a traveling conveyer for gathering material and delivering material to the loading position of said endless conveyer, an electric motor mounted on said frame structure, a cable winding and unwinding mechanism controlled by said electric motor, a reel, an electrical conductor stored on said reel and extendible and retractable with respect thereto and adapted to be extended from the reel to a remote position on said traveling conveyer, a pulling cable extending between said traveling conveyer and said cable winding and unwinding mechanism, a power source carried by said traveling conveyer, an electrical circuit control carried by said traveling conveyer, relay mechanism located on said frame structure and an electrical circuit connection established between said relay mechanism through said reel, the electrical conductor thereon, the connection thereof on said traveling conveyer, the electrical circuit control on said traveling conveyer and through the power source on said traveling conveyer and completed through the pulling cable extending from said cable winding and unwinding mechanism on said frame structure for completing an electrical circuit through said relay mechanism for controlling and starting, stopping and reversing of said electric motor and correspondingly controlling the linear travel of said traveling conveyer with respect to the loading position of said endless conveyer.

LESTER D. HERSHEY.

REFERENCES CITED

The following references are of record in the file of this patent:

UNITED STATES PATENTS

| Number | Name | Date |
|---|---|---|
| 679,448 | Westbrook | July 30, 1901 |
| 681,941 | Westbrook | Sept. 3, 1901 |
| 704,671 | Ackerman | July 15, 1902 |
| 1,053,206 | Myers | Feb. 18, 1913 |
| 1,340,345 | Price | May 18, 1920 |
| 1,352,045 | Bergey | Sept. 7, 1920 |
| 1,514,097 | Packer | Nov. 4, 1924 |
| 2,395,238 | Thwaites | Feb. 19, 1946 |

FOREIGN PATENTS

| Number | Country | Date |
|---|---|---|
| 651,316 | France | Oct. 9, 1928 |